Dec. 19, 1967  P. E. BRADLEY  3,358,558
DISSOLVING DEVICE FOR MULTIPLE PROJECTORS
Filed July 26, 1965

INVENTOR.
PAUL E. BRADLEY

BY Lockwood, Woodard, Smith & Weikart
Attorneys

Dec. 19, 1967  P. E. BRADLEY  3,358,558
DISSOLVING DEVICE FOR MULTIPLE PROJECTORS
Filed July 26, 1965  2 Sheets-Sheet 2
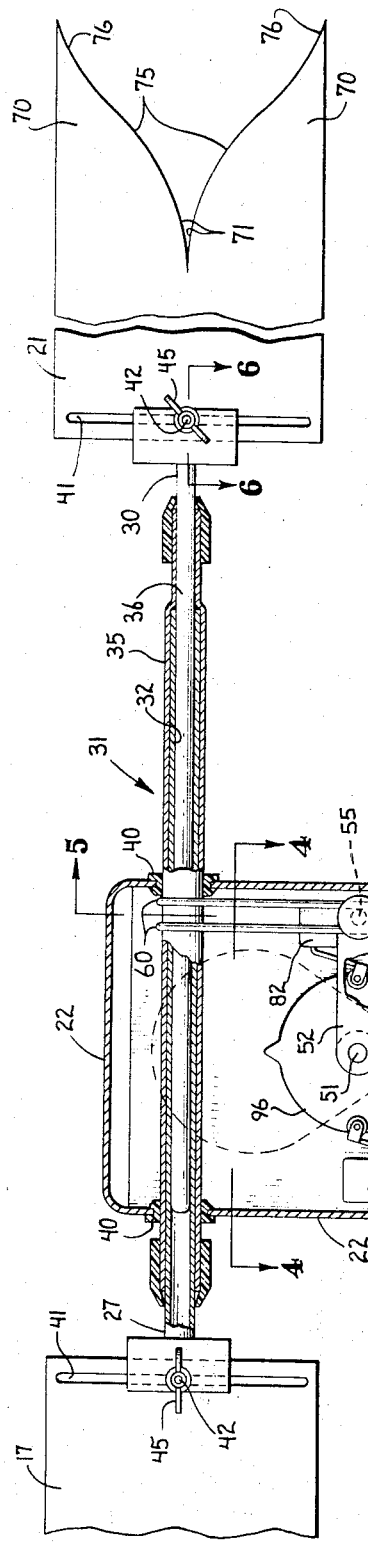
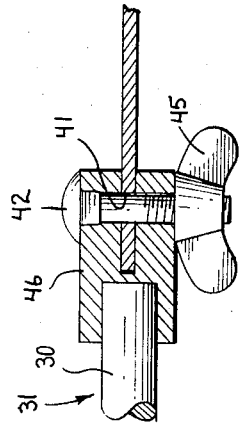
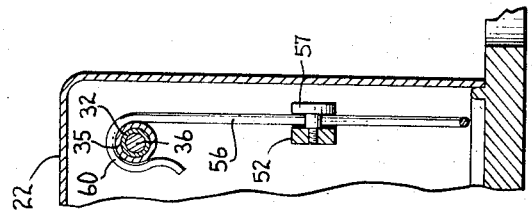
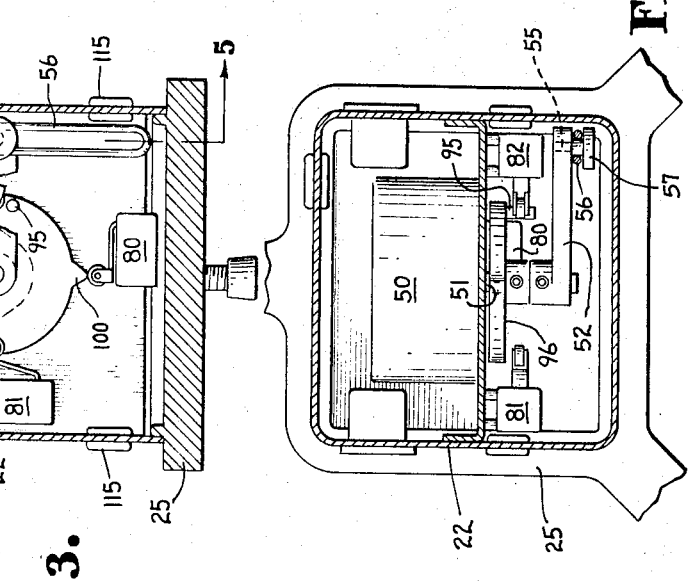
INVENTOR.
PAUL E. BRADLEY
BY Lockwood, Woodard, Smith & Weikart
Attorneys

United States Patent Office 3,358,558
Patented Dec. 19, 1967

3,358,558
DISSOLVING DEVICE FOR MULTIPLE
PROJECTORS
Paul E. Bradley, 3721 N. LaSalle St.,
Indianapolis, Ind. 46218
Filed July 26, 1965, Ser. No. 474,554
3 Claims. (Cl. 88—28)

ABSTRACT OF THE DISCLOSURE

An optical image projector device for use with a pair of projectors which includes a pair of blinds which are moved into and out of covering relation to a pair of projectors to provide a dissolve from the image of one projector to the other. An electrical circuit and cam arrangement is provided for automatically turning off the device and for automatically actuating the slide changer of the other projector which is covered by its blind just after the dissolving action has occurred.

The present invention relates to optical image projector mechanism and more particularly to apparatus for controlling the changing from one projected image to another.

It is known in the prior art to provide mechanism for shifting on a screen from the image of one slide projector to the image of another slide projector. These prior art devices have not proven to be completely satisfactory for a number of reasons. For example, they are relatively complicated; they must be tied in mechanically to the individual slide projectors, and the two slide projectors must be identical in configuration. Consequently, it is a primary object of the present invention to provide an improved mechanism for changing from one projected image to another.

A further object of the invention is to provide a device capable of eliminating the dark periods normally present on the screen while standard projectors are changing slides.

Another object of this invention is to provide a device capable of providing better more evenly controlled dissolves from one projected image to another and capable of eliminating normal picture motion that is present in many standard projectors, as one picture moves off the screen, giving way to the next picture.

A further object of this invention is to provide a device of the present nature which does not give a shadow on the final picture of a show but instead gives a gradual fade out.

Still other objects of the present invention are to provide mechanism for changing from one projected image to another which mechanism is simple, dependable and easy to manufacture; to provide such mechanism which is usable with a pair of slide projectors of different shape and size, and to provide such mechanism which does not have to be tied in mechanically to the slide projectors.

Related objects and advantages will become apparent as the description proceeds.

One embodiment of the present invention might include an optical image projector device for use with a pair of projectors which comprises a housing, a pair of blinds one for each of said projectors, each of said projectors being adapted to project a beam of projection light, an elongated element connecting and mounting said blinds at its distal ends and extending through said housing, and means for moving said elongated element longitudinally to move one of said blinds into blocking relation with one of said beams and one of said blinds out of blocking relation with the other of said beams.

The full nature of the invention will be understood from the accompanying drawings and the following description and claims.

FIG. 3 is a vertical section taken along the line 3—3 of FIG. 2 in the direction of the arrows.

FIG. 4 is a horizontal section taken along the line 4—4 of FIG. 3 in the direction of the arrows.

FIG. 5 is a vertical section taken along the line 5—5 of FIG. 3 in the direction of the arrows.

FIG. 6 is an enlarged section taken along the line 6—6 in the direction of the arrows.

Figure 1:
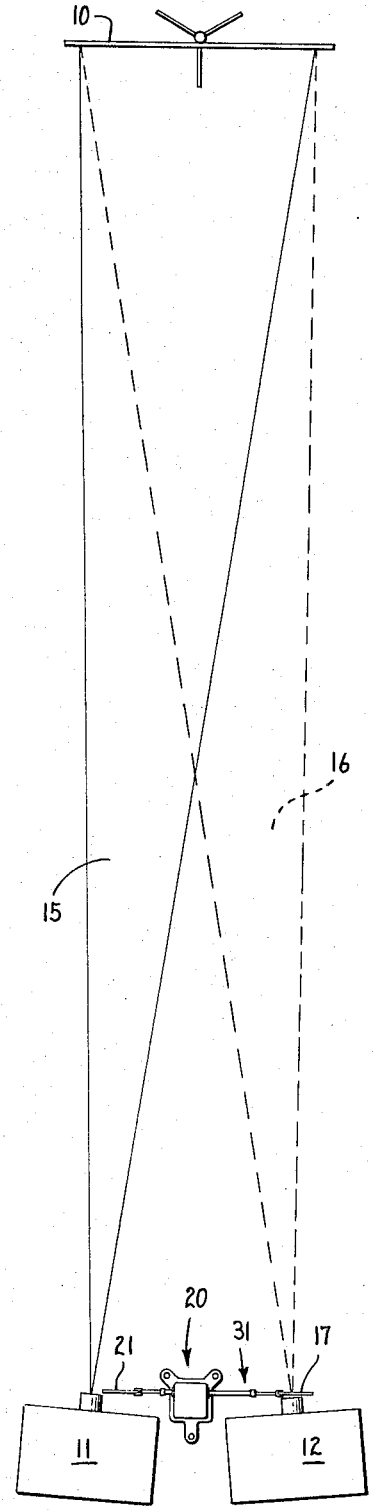
FIG. 1 is a top plan view of a slide projector arrangement a portion of which embodies the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings there is illustrated a screen 10 (FIG. 1) onto which is thrown an image from each of a pair of slide projectors 11 and 12. The projector 11 is shown as projecting a beam of projection light 15. The projector 12 is also capable of projecting a similar such beam 16 as shown in dotted lines. When the apparatus is in the position of FIG. 1, however, the beam 16 is blocked by the blind 17 of the mechanism 20. It can be seen that the blind 21 of the mechanism 20 is positioned out of the path of the beam 15.

Figure 2:
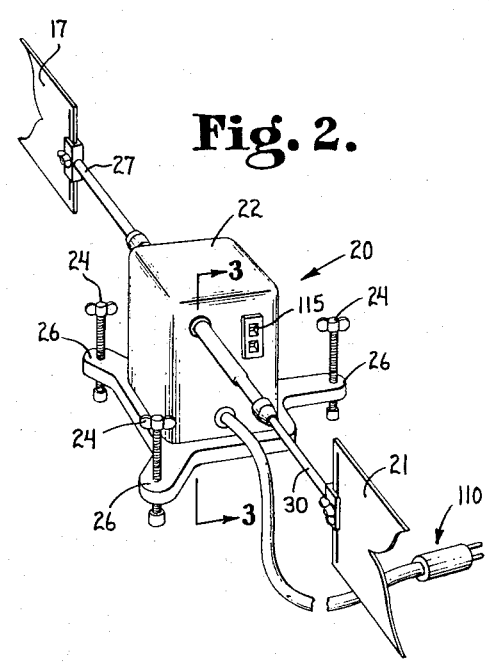
FIG. 2 is a perspective view of the image-changing device of the present invention.

Referring more particularly to FIGS. 2, 3 and 4, the mechanism 20 is shown as including a housing 22 having a base 25 which is press fitted into the upper portion of the housing. The base 25 includes three legs 26 each of which receives a respective one of a plurality of thumb screws 24. The position of the thumb screws can be adjusted so as to set the mechanism 20 at any of a number of angles or attitudes facilitating the use of the mechanism with slide projectors of differing sizes and shape and even with a pair of slide projectors which are different one from the other.

The two blinds 17 and 21 are mounted on the distal ends 27 and 30 of an elongated element 31 which consists of a pair of tubes 32 and 35 telescoped one within the other and a rod or tube 36 telescoped within the tubes 32 and 35. The rod 36 can be pulled rightwardly as viewed in FIG. 3 away from the housing 22 to provide for a slide projector which is, for example, relatively large or can be pushed in or leftwardly as viewed in FIG. 3 to provide for a smaller slide projector. Similarly the tube 32 can be pulled out or moved to a leftward position as viewed in FIG. 3 to provide for a larger slide projector or pushed into the tube 35 to a rightward position to provide for a smaller slide projector.

The basic manner of operation of the present apparatus is by horizontal or longitudinal movement of the elongated element 31 to move one of the blinds 17 and 21 into covering relation blocking one of the beams 15 and 16 and to simultaneously move the other of the blinds out of blocking relation to the other of the beams. The grommets and bearings 40 are mounted in the wall of the housing 22 and provide a loose slidable mounting for the elongated element 31. Depending upon the height of the particular slide projectors being used, the blinds 17 and 21 can be adjusted upwardly or downwardly by means of the slots 41 in each of the blinds, said slots each receiving a respective screw 42 secured in place by a respective wing nut 45. As shown in FIG. 6, the respective screws 42 project through the slots 41 and also project through the respective adapters 46 fixed to the distal ends 27 and 30 of the elongated element 31.

The elongated element 31 is moved longitudinally by a motor 50 which has a drive shaft 51 upon which is mounted a crank arm 52. The distal end of the crank arm 52 has fixed therein a pin 55 or screw which projects through a member 56 fixed to the elongated element 31. The pin or screw 55 has a cap 57 which rides within a slot 60 defined by the member 56. As the drive shaft 51 and arm 52 are rotated by the motor 50, the elongated element 31 is caused to move from the far rightward position illustrated in FIG. 3 to a far leftward position and back again.

FIG. 5 shows the manner in which the member 56 is mounted upon the elongated element 31 this being accomplished by the spring action in the looped portions 60 of the two upper ends of the member 56.

The particular shape of the bifurcated portions 70 of the blinds 17 and 21 should be noted because this shape provides the desired dissolving action from one image to another. It will be noted that the space 71 between the two bifurcated portions 70 has the shape of the wings of a bird in flight. That is, the shape first diverges at 72 at a relatively small angle then spreads at a relatively wide angle at 75 and again diverges at a relatively small angle at 76.

Figure 7:
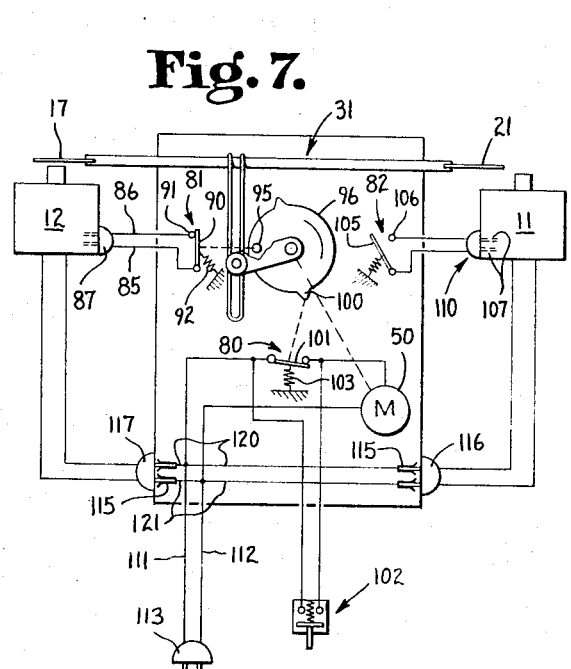
FIG. 7 is a schematic electrical diagram of the apparatus of the present invention.

In FIGS. 3 and 4 there is shown three limit switches 80, 81 and 82 all mounted within the housing 22. Referring to FIG. 7, the limit switch 81 is connected in a circuit including the wires 85 and 86 which lead to a two-prong electrical plug 87 adapted to be plugged into the slide projector 12. It is conventional for slide projectors to be provided with an automatic slide changer mechanism whereby the closing of a circuit between the two sides of a female receptacle in the slide projector will cause the slide projector to change to the next slide. Such a conventional slide projector is Model #700 Rotomatic manufactured by Sawyer's of Portland, Oreg. As is suggested in FIGS. 3, 4 and 7, the contact 90 of the limit switch 81 is normally held in an open position disconnected from the contact 91 by means of a suitable spring 92. The contacts 90 and 91 are closed, however, by the engagement of the limit switch actuating arm with a cam 95 mounted on a cam wheel 96 fixed to the drive shaft 51 of the motor. As the mechanism is shown in FIG. 7, it is just completing movement of the elongated element 31 to a position wherein blind 17 covers the projector 12 and blocks its beam. In this position, it is desirable that the automatic slide changer mechanism of the projector 12 be actuated to change to the next slide. This is accomplished by engagement of the actuating arm of the limit switch 81 by the cam 95 which is shown as occurring in FIG. 7.

Just subsequent to this occurrence and just subsequent to the release of the spring biased contact 90 and movement thereof to a position out of contact with the contact 91, a cam 100 on the cam wheel 96 engages the actuating arm of the limit switch 80 opening the contacts 101 and stopping the rotation of the motor 50. The contacts 101 are normally yieldably retained in a closed condition by a spring 103. A spring biased push button arrangement 102 is connected in parallel relation with the limit switch 80 and may be closed to connect the electrical power to the motor 50 momentarily in order to move the cam 100 away from the limit switch 80 and to electrically lock in the motor 50 to its power supply. The motor will then move its drive shaft 180° while moving the elongated element 31 to the opposite end of its travel. Just prior to the completion of the 180° movement and the movement of the elongated element 31 to the opposite end of its travel, the cam 95 will engage the spring biased contact 105 of the limit switch 82 which is normally in an open position momentarily closing this contact 105 into engagement with contact 106. Such operation closes the electrical circuit between the two prongs 107 of the electrical plug 110 and thus actuates the automatic slide changing mechanism of the slide projector 11. Of course, the automatic changer means of the projector 11 can be similar or identical to the automatic slide changer of the projector 12.

The plug 113 is provided with lead in wires 111 and 112 which conduct the power to the motor 50. Also mounted in the wall of the housing 22 are electrical receptacles 115 which are used to provide electrical power to the power input plugs 116 and 117 of the slide projectors 11 and 12. These receptacles 115 are provided with current through wires 120 and 121 connected to the wires 111 and 112.

It will be evident from the above description that the present invention provides an improved mechanism for changing one projected image to another. It will also be evident that the changing mechanism of the present invention is simple, dependable and easy to manufacture and is usable with a pair of slide projectors of different size and shape.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. An optical image projector device for use with a pair of projectors which comprises blind means, each of said projectors being adapted to project a beam of projection light and each including automatic slide changing mechanism, a housing having said blind means mounted thereon, a motor mounted on said housing and coupled to said blind means for moving it into a first position wherein said blind means interrupts the projection light of one of said projectors and for moving it into a second position wherein said blind means interrupts the projection light of the other of said projectors, control means for said motor including circuit means arranged to alternately actuate said projectors to change a slide after the beam of each of them is blocked by said blind means, said control means including a cam wheel mounted on the drive shaft of said motor, three limit switches mounted on said housing, a first of said three limit switches being spring biased to a normally open position, a two pronged electrical plug connected across said first limit switch and engageable with a first of said pair of projectors for actuating the automatic slide changing mechanism thereof, a second of said three limit switches being spring biased to a normally open position, a two pronged electrical plug connected across said second limit switch and engageable with a second of said pair of projectors for actuating the automatic slide changing mechanism thereof, a third of said three limit switches being spring biased to a normally closed position, said third limit switch being connected in series with said motor and controlling the operation thereof, a push button connected across said third limit switch for shorting out said third limit switch and starting said motor in operation, a pair of cams arranged at 180° on said cam wheel and positioned to actuate said third limit switch twice for every single revolution of the cam wheel, and a further cam positioned to actuate each of said first and second switches once for every single revolution of said cam wheel and to actuate and release said first switch just prior to one of said pair of cams actuating said third switch and to actuate and release said second switch just prior to the other of said pair of cams actuating said third switch.

2. An optical image projector device for use with a pair of horizontally spaced projectors which comprises a housing, a pair of blinds one for each of said projectors, each of said projectors being adapted to project a beam of projection light and each including automatic slide changing mechanism, an elongated element connecting and mounting said blinds at its opposite ends and extending horizontally through said housing, said connecting element including a plurality of telescoped members with different ones of said members at the opposite ends of said element whereby the length of said element can be adjusted to adjust the spacing between said blinds, each of said blinds being individually vertically adjustable relative to said element, means secured to said element and defining a vertical slot, a rotory motor having a drive shaft, a radial arm secured to said drive shaft, pin means secured to the distal end of said arm and slidable in said vertical slot, control means for said motor including circuit means arranged to alternately actuate said projectors to change a slide after the beam of each of them is blocked by a respective blind, said control means including a cam wheel mounted on the drive shaft of said motor, three limit switches mounted in said housing, a first of said three limit switches being spring biased to a normally open position, a two pronged electrical plug connected across said first limit switch and engageable with a first of said pair of projectors for actuating the automatic slide changing mechanism thereof, a second of said three limit switches being spring biased to a normally open position, a two pronged electrical plug connected across said second limit switch and engageable with a second of said pair of projectors for actuating the automatic slide changing mechanism thereof, a third of said three limit switches being spring biased to a normally closed position, said third limit switch being connected in series with said motor and controlling the operation thereof, a push button connected across said third limit switch for shorting out said third limit switch and starting said motor in operation, a pair of cams arranged at 180° on said cam wheel and positioned to actuate said third limit switch twice for every single revolution of the cam wheel, and a further cam positioned to actuate each of said first and second switches once for every single revolution of said cam wheel and to actuate and release said first switch just prior to one of said pair of cams actuating said third switch and to actuate and release said second switch just prior to the other of said pair of cams actuating said third switch.

3. An optical image projector device for use with a pair of horizontally spaced projectors which comprises a housing, a pair of blinds one for each of said projectors, each of said projectors being adapted to project a beam of projection light and each including automatic slide changing mechanism, an elongated element connecting and mounting said blinds at its opposite ends and extending horizontally through said housing, said connecting element including a plurality of telescoped members with different ones of said members at the opposite ends of said element whereby the length of said element can be adjusted to adjust the spacing between said blinds, each of said blinds being individually vertically adjustable relative to said element, means secured to said element and defining a vertical slot, a rotary motor having a drive shaft, a radial arm secured to said drive shaft, pin means secured to the distal end of said arm and slidable in said vertical slot, control means for said motor including circuit means arranged to alternately actuate said projectors to change a slide after the beam of each of them is blocked by a respective blind, said control means including a cam wheel mounted on the drive shaft of said motor, three limit switches mounted in said housing, a first of said three limit switches being spring biased to a normally open position, a two pronged electrical plug connected across said first limit switch and engageable with a first of said pair of projectors for actuating the automatic slide changing mechanism thereof, a second of said three limit switches being spring biased to a normally open position, a two pronged electrical plug connected across said second limit switch and engageable with a second of said pair of projectors for actuating the automatic slide changing mechanism thereof, a third of said three limit switches being spring biased to a normally closed position, said third limit switch being connected in series with said motor and controlling the operation thereof, a push button connected across said third limit switch for shorting out said third limit switch and starting said motor in operation, a pair of cams arranged at 180° on said cam wheel and positioned to actuate said third limit switch twice for every single revolution of the cam wheel, and a further cam positioned to actuate each of said first and second switches once for every single revolution of said cam wheel and to actuate and release said first switch just prior to one of said pair of cams actuating said third switch and to actuate and release said second switch just prior to the other of said pair of cams actuating said third switch, each of said blinds being bifurcated at its distal end with a diverging space between the bifurcations approaching the shape of the wings of a bird in flight.

References Cited

UNITED STATES PATENTS

| | | | |
|---|---|---|---|
| 1,144,108 | 6/1915 | Buttner et al. | 352—91 |
| 2,528,855 | 11/1950 | Cadivell et al. | 88—28 |
| 2,530,417 | 11/1950 | Young | 88—28 |
| 3,240,118 | 3/1966 | Van Marter | 88—28 |

JOHN M. HORAN, *Primary Examiner.*

NORTON ANSHER, *Examiner.*

R. M. SHEER, *Assistant Examiner.*